US009253225B1

(12) United States Patent
Junee et al.

(10) Patent No.: US 9,253,225 B1
(45) Date of Patent: *Feb. 2, 2016

(54) REAL-TIME INTERACTION DURING VIDEO VIEWING

(71) Applicant: Google Inc., Mountain View, CA (US)

(72) Inventors: Ryan Junee, San Francisco, CA (US); Herbert Ho, San Jose, CA (US); Yu Pan, San Francisco, CA (US); Erik Klein, Sunnyvale, CA (US); Slave Jovanovski, San Bruno, CA (US); Julian Frumar, San Francisco, CA (US); Jasson Arthur Schrock, Mountain View, CA (US); Richard B. Leider, San Francisco, CA (US); Mohan Nibhanupudi, San Jose, CA (US)

(73) Assignee: Google Inc., Mountain View, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 14/029,583

(22) Filed: Sep. 17, 2013

Related U.S. Application Data (63) Continuation of application No. 12/764,949, filed on Apr. 22, 2010, now Pat. No. 8,555,177.

(60) Provisional application No. 61/171,764, filed on Apr. 22, 2009.

(51) Int. Cl.
*G06F 3/00* (2006.01)
*H04L 29/06* (2006.01)

(52) U.S. Cl.
CPC .................. *H04L 65/403* (2013.01)

(58) Field of Classification Search
CPC .................. H04N 21/44222; H04L 65/403
See application file for complete search history.

(56) References Cited

U.S. PATENT DOCUMENTS

| | | | |
|---|---|---|---|
| 5,793,365 | A | 8/1998 | Tang et al. |
| 5,960,173 | A | 9/1999 | Tang et al. |
| 6,081,830 | A | 6/2000 | Schindler |
| 7,698,649 | B2 | 4/2010 | Quillen et al. |
| 2008/0229215 | A1 | 9/2008 | Baron et al. |
| 2009/0249223 | A1* | 10/2009 | Barsook et al. ............... 715/753 |
| 2009/0328122 | A1 | 12/2009 | Amento et al. |

OTHER PUBLICATIONS

"TestTube" YouTube, LLC, 2009, 1 page, [online] [retrieved on Apr. 22, 2009] Retrieved from the internet <URL:http://www.youtube.com/testtube>.

"Streams" YouTube, LLC, 2009, 3 pages, [online] [retrieved on Apr. 22, 2009] Retrieved from the internet <URL:http://www.youtube.com/streams_main>.

(Continued)

*Primary Examiner* — Omar Abdul-Ali
(74) *Attorney, Agent, or Firm* — Fenwick & West LLP (57) ABSTRACT

Community interaction during video viewing is provided. A video hosting website includes videos available for viewing. Users establish lists of friends, who are other users of the video hosting site. When a user logs on, her presence is made known by an interaction engine to her friends that are also logged in to the site. The user's activities are tracked and her friends are notified of those activities. Tracked activities may include viewing a video, rating a video, commenting on a video, uploading a video to the site, and adding a new friend. Friends are notified of these activities in one embodiment through one or more user interface elements. A user can select a user interface element to discover which of her friends are also watching the same video at that time. A user watching a video can summon her online friends to the watch page to watch collaboratively.

22 Claims, 10 Drawing Sheets

(56) References Cited

OTHER PUBLICATIONS

"Explore YouTube—Don't Just Watch, Dive in!" YouTube, 2009, 2 pages, [online] [retrieved on Apr. 22, 2009] Retrieved from the internet <URL:http://www.youtube.com/t/explore_youtube>.

"Wesker's V.I.P.S," YouTube Streams, YouTube, LLC, 2009, 1 page.

Office Action for U.S. Appl. No. 12/764,949, Aug. 2, 2012, 15 Pages.

Office Action for U.S. Appl. No. 12/764,949, Nov. 28, 2011, 13 Pages.

* cited by examiner

REAL-TIME INTERACTION DURING VIDEO VIEWING

CROSS-REFERENCE TO RELATED APPLICATION

This application is a continuation of U.S. patent application Ser. No. 12/764,949 filed Apr. 22, 2010, which claims the benefit of U.S. Provisional Application No. 61/171,746 filed Apr. 22, 2009, each of which is hereby incorporated by reference in its entirety.

BACKGROUND OF THE INVENTION

1. Field

The present invention is generally related to user interaction on an online video hosting site. In particular, the present invention is directed toward enabling communication and information sharing for a community of users of a video hosting site.

2. Description of the Related Art

Video hosting websites provide an opportunity for contributors to share content with other members. This content typically includes items such as home movies, projects and other user-generated content, and also often includes content licensed by various rights holders. By sharing their videos with site members, contributors gain feedback and exposure, facilitating the expression of ideas and exchange of dialogue.

Video hosting sites typically provide content viewers an opportunity to provide responses to the content contributors. For example, viewers can often rate the content, or leave comments about it, either publicly for all to see, or privately for the contributor. Some video hosting sites allow users to assemble playlists of videos and to publicize their playlists for others to watch if they wish to.

SUMMARY

The various embodiments of the present invention enable community interaction during video viewing by providing a collaborative viewing environment for users. A video hosting website includes videos available for viewing, e.g., over the Internet or other network. Users of the video hosting site establish lists of friends, who are other users of the video hosting site. When a user logs on to the video hosting site, her presence is made known by an interaction engine to her friends that are also logged in to the site. As the user undertakes various activities on the site, the activities are tracked and her friends are notified of those activities. Tracked activities in one embodiment include viewing a video, rating a video, commenting on a video, uploading a video to the site, and adding a new friend. Friends are notified of these activities in one embodiment through one or more user interface elements, provided in one example in a region of some or all pages on the video hosting site. For example, a user browsing the web site may receive a pop-up alert informing her that a friend has just signed on, or has just rated a video. On any given watch page, a user can select a user interface element to discover which of her friends are also watching the same video at that time. A user watching a video in one embodiment can summon her online friends to the watch page so that the video can be watched by those friends. In one embodiment, the portion of the video currently being viewed by the summoning user is also made known to the summoned friends, so that the viewing can occur in a simultaneous or near-simultaneous fashion; in alternative embodiments, the summoned viewers simply start watching the video from the beginning.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Real-time interaction during video viewing allows a user to see a list of the people online that the user is interested in, and to be able to contemporaneously observe what those people are doing or have just recently done on the video hosting site. The user can further interact with her online friends by inviting them to watch a video as a group, and having a simultaneous chat with the other group members as they watch the video.

Figure 1:
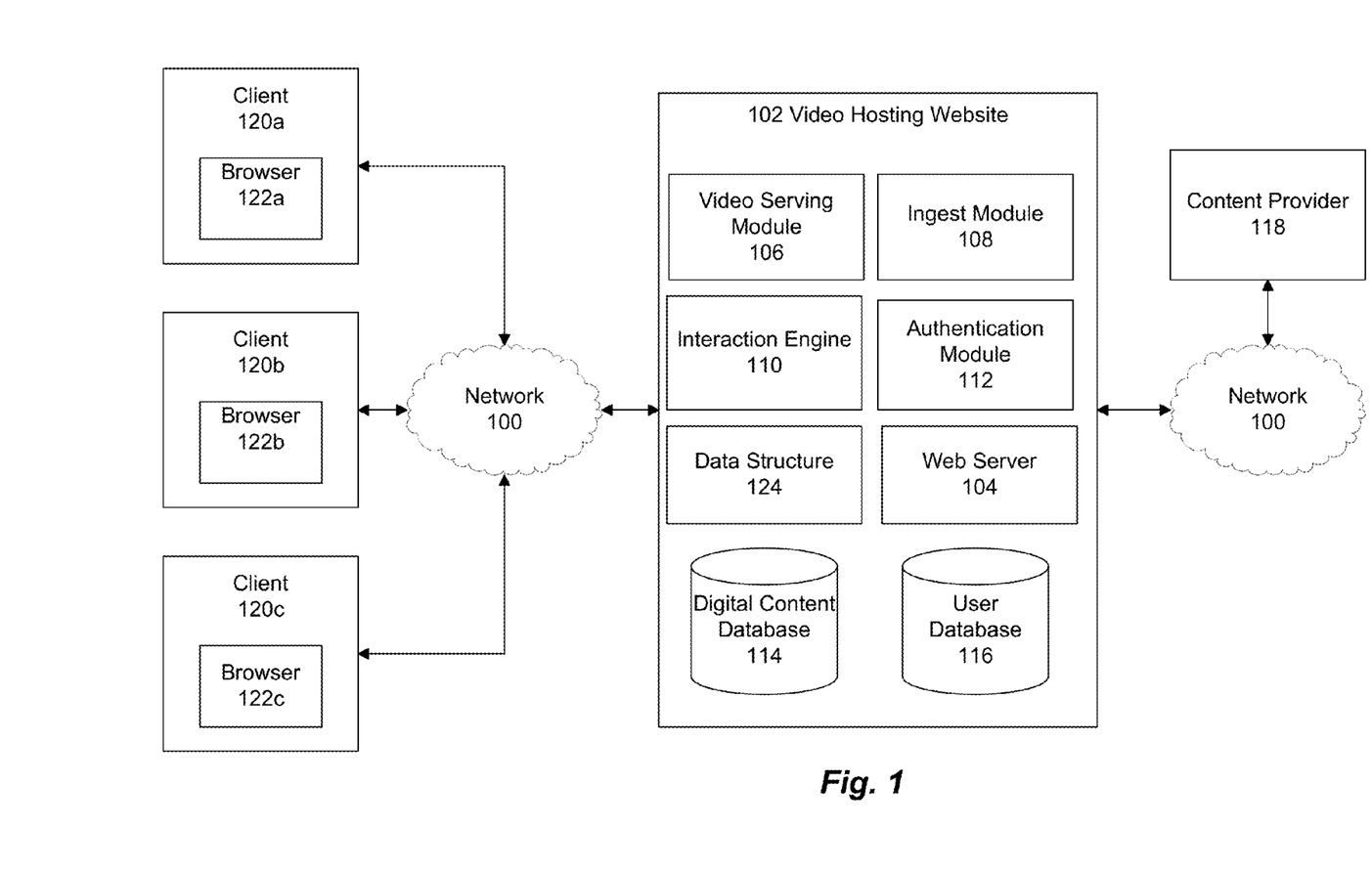
FIG. 1 is an illustration of a system for providing community interaction during viewing of videos on a video hosting website 102 in accordance with an embodiment of the present invention.

FIG. 1 illustrates a video hosting website 102, which in the illustrated embodiment includes a web server 104, a interaction engine 110, an authentication module 112, a data structure 124, a digital content database 114 and a user database 116. Many conventional features, such as firewalls, load balancers, application servers, failover servers, site management tools and so forth are not shown so as not to obscure the features of the system. One suitable website 102 for implementation of the system is the YOUTUBE™ website, found at www.youtube.com; other video hosting sites are known as well, and can be adapted to operate according to the teaching disclosed here. The term "web site" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together, as deemed appropriate by the implementer.

The server is implemented as server program executing on server-class computer comprising a CPU, memory, network interface, peripheral interfaces, and other well known components. The computers themselves in one embodiment run an operating system such as LINUX, Microsoft Windows, Mac OS, etc., have generally high performance CPUs, 1 G or more of memory, and 100 G or more of disk storage. Of course, other types of computers can be used, and as more powerful computers are developed in the future, they can be configured in accordance with the teachings here. The functionality implemented by any of the elements can be provided from computer program products that are stored on computer-readable storage media (e.g., RAM, hard disk, or optical/magnetic media).

A client device 120 executes a browser 122 and can connect to the web server 104 to access digital content items via a network 100, which is typically the Internet, but can also be any network, including but not limited to any combination of a LAN, a MAN, a WAN, a mobile, wired or wireless network, a private network, or a virtual private network. While only three clients 120a, 120b, and 120c and their respective browsers 122a, 122b, and 122c are shown, it is understood that very large numbers (e.g., millions) of clients are supported and can be in communication with the video hosting website 102 at any time. The client 120 may include a variety of different computing devices. Some examples of client devices 120 include personal computers, notebook computers, digital assistants, personal digital assistants, cellular phones, smart phones, mobile phones, or laptop computers.

The browser 122 can include any application that allows users of client 120 to access video content over a network, and may form software available separately from client device 120, or may form a part of the device's software, as is the case with some mobile telephone devices. Some suitable separate applications are Microsoft Internet Explorer, Netscape Navigator, Mozilla Firefox, Apple Safari or any application adapted to allow access to web pages on the World Wide Web. The browser 122 can also include a video player (e.g., Flash™ from Adobe Systems, Inc.), or any other player adapted for the video file formats used in the video hosting website 102. A user can access a set of videos from the video hosting website 102 by browsing a catalog of videos, conducting searches on keywords, reviewing play lists or real-time viewing data from friends, other users or the system administrator (e.g., collections of videos forming channels), or viewing videos associated with particular user group (e.g., communities).

The content provider 118 provides digital content items to the video hosting website 102 via the network 100. While only one content provider 118 is shown, it is understood that any number of content providers are supported and can be in communication with the video hosting website 102 at any time. Content providers 118 may also be users of the video hosting website 102, though they need not be.

The uploaded digital content items can include, for example, video, audio, or a combination of video and audio. Alternatively, a digital content item may be a still image, such as a JPEG or GIF file or a text file. For purposes of convenience and ease of description, we describe embodiments in which the digital content is video, though no limitation on the types of potential digital content items is intended by this terminology.

The web server 104 is responsible for communication between the video hosting website 102 and client 122 and content provider 118. The web server receives requests for videos and related information, and provides videos and other requested information in return.

The ingest module 108 receives and processes uploaded videos from the content provider 118 for storage in the digital content database 114. This processing can include format conversion (transcoding), compression, metadata tagging, and other data processing.

The video serving module 106 receives and responds to requests for videos and related information. Video serving module 106 includes logic for searching the digital content database 114 in response to search requests, and for providing search results.

The digital content database 114 stores the videos available for viewing on the video hosting site 102. The digital content database 114 stores video content and associated metadata provided by their respective content provider 118, or by the operator of video hosting website 102, or by third parties. The videos have metadata associated with each file such as a video ID, artist, video title, label, genre, time length, and optionally geo-restrictions that can be used for data collection or content blocking on a geographic basis. Content is retrieved from the digital content database 114 by video serving module 106 in response to user requests to view videos.

The user database 116 maintains a record of all registered users on the video hosting website 102. Each individual user of the video hosting website 102 registers account information such as a login name, electronic mail (e-mail) address, and password with the video hosting website 102. This account information is stored in the user database 116. The user database 116 further maintains user information, e.g., in the form of a profile, for users who log into the system. User information is retrieved from the user database 116 in response to user requests for user information, such as the profile. User database 116 also stores, for each user, a list of the user's friends.

The authentication module 112 is responsible for granting user access to the video hosting website 102. The authentication module 112 verifies the provided account information for each user before users are granted full access. Alternatively, users may access the video hosting website 102 to perform some or all user functions without having to provide account information (e.g., log in) to the authentication module 112. For example, users only interested in viewing videos in the video hosting website 102 are not required to have their account information authenticated, but in one embodiment will not be able to participate in receiving notifications or in collaborative viewing with other users.

The interaction engine 110 facilitates collaborative viewing of videos and interaction between online users of video hosting site 102. Interaction engine 110 tracks which users are online and what videos they are viewing, provides notifications to users about activities their friends are undertaking, and allows users watching the same video to communicate with one another.

In one embodiment, each signed-on user is represented by a process tracked by interaction engine 110. Interaction engine 110 tracks events such as user sign-on, video viewing, and online friends. In one embodiment, interaction engine 110 separately tracks friends who are both online and active, and excludes those friends signed on and idle. Reference below to online friends is applicable to either embodiment at the discretion of the implementer.

In one embodiment, each user registered with video hosting website 102 is able to add other users of the site to a list of friends. The list of friends is stored in user database 116 in association with the user's account.

As noted, a user accesses video hosting website 102 through a browser 122 executing on a client device 120. For the remainder of this disclosure, we refer generally to "client 120" as an entity performing various tasks or executing certain steps. From the context, however, it will be understood that the reference is either to the device itself, the browser executing on the client, or the user controlling the browser and device, as appropriate.

In one embodiment, client 120 signs on to video hosting website 102, e.g., by accessing a URL associated with web server 104. The client 120 provides user credentials, which are verified by authentication module 112 against data in user database 116. Assuming the credentials are valid, the client is then logged in.

Figure 2:
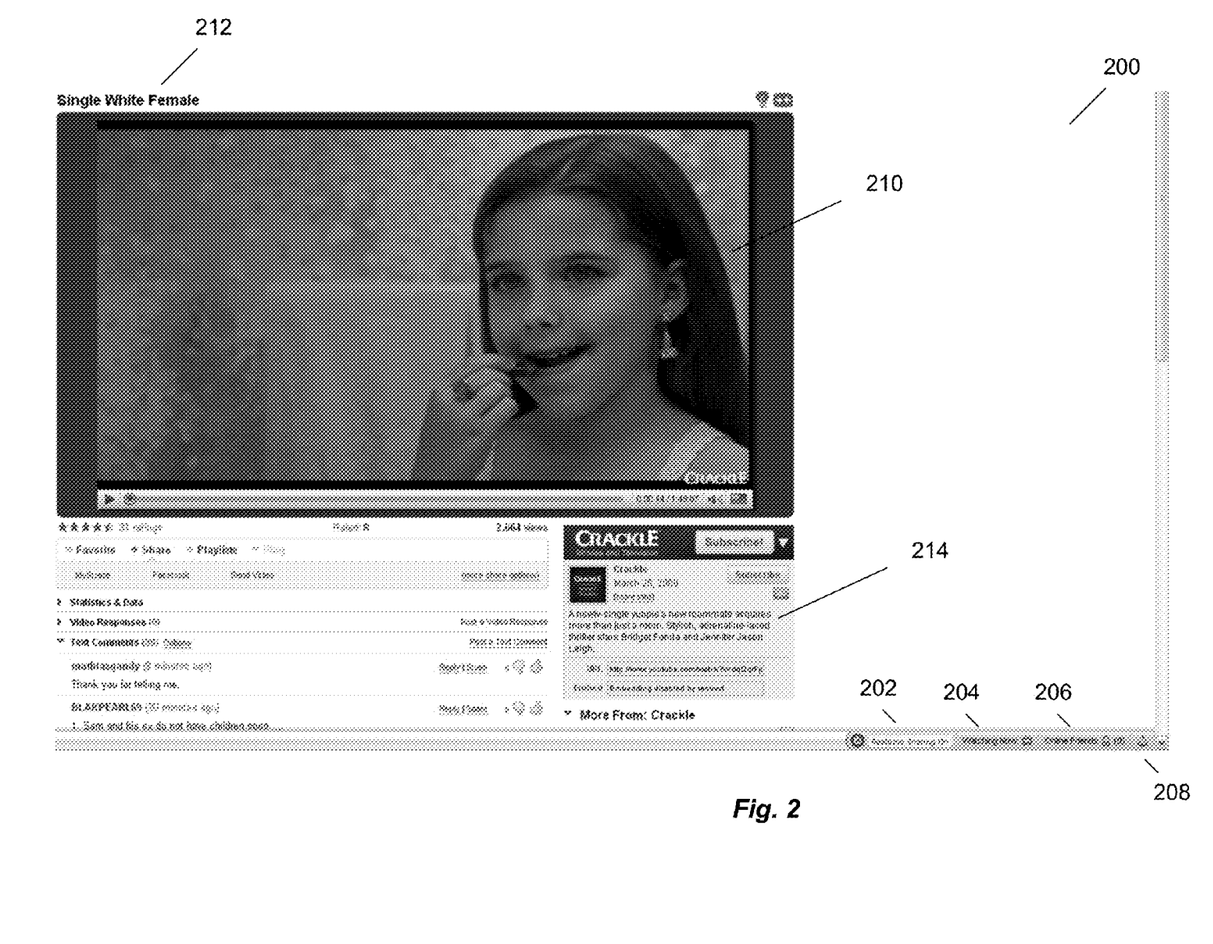
FIG. 2 illustrates an example of a video watch page in accordance with an embodiment of the present invention.

FIG. 2 illustrates an example of a video watch page 200. A watch page 200 is typically a web page (or other user interface element) that includes a video, typically embedded in a player on the page, as well as other information related to the video. For example, watch page 200 includes a video 210, title 212, summary information 214 including the contributor and a description of the video, and the like.

Watch page 200 also includes UI elements related to collaborative viewing of the video. For example, watch page 200 includes a selectable indicator or button 202 indicating that the realtime sharing feature is active. A user can select the indicator 202, for example, by clicking on the button 202, and deactivate the realtime sharing feature. The watch page 200 also includes a user interface button 204 for displaying a list (not shown) of users currently watching the video 210, and a button 206 for displaying a list (not shown) of all of the user's friends that are currently online. In one embodiment, another UI element 208 indicates that the user has an alert. An alert is a system message for the user relating to collaborative viewing, and may include, for example, a notification that one of the user's friends has come online, gone offline, or taken action with respect to a video. Action with respect to a video can include starting to watch a video, commenting on a video, adding a video to the user's favorites, adding the video to a playlist, or rating the video. In one embodiment, when a user has one or more alerts, an icon on the UI element 208 changes to a different color—for example, from green to red. Alternatively, the UI element may expand or pop up to automatically display the contents of the alert. Note that the collaborative UI elements are not restricted to appearing only on watch pages, but may appear on any user interface page associated with video hosting site 102.

Figure 3:
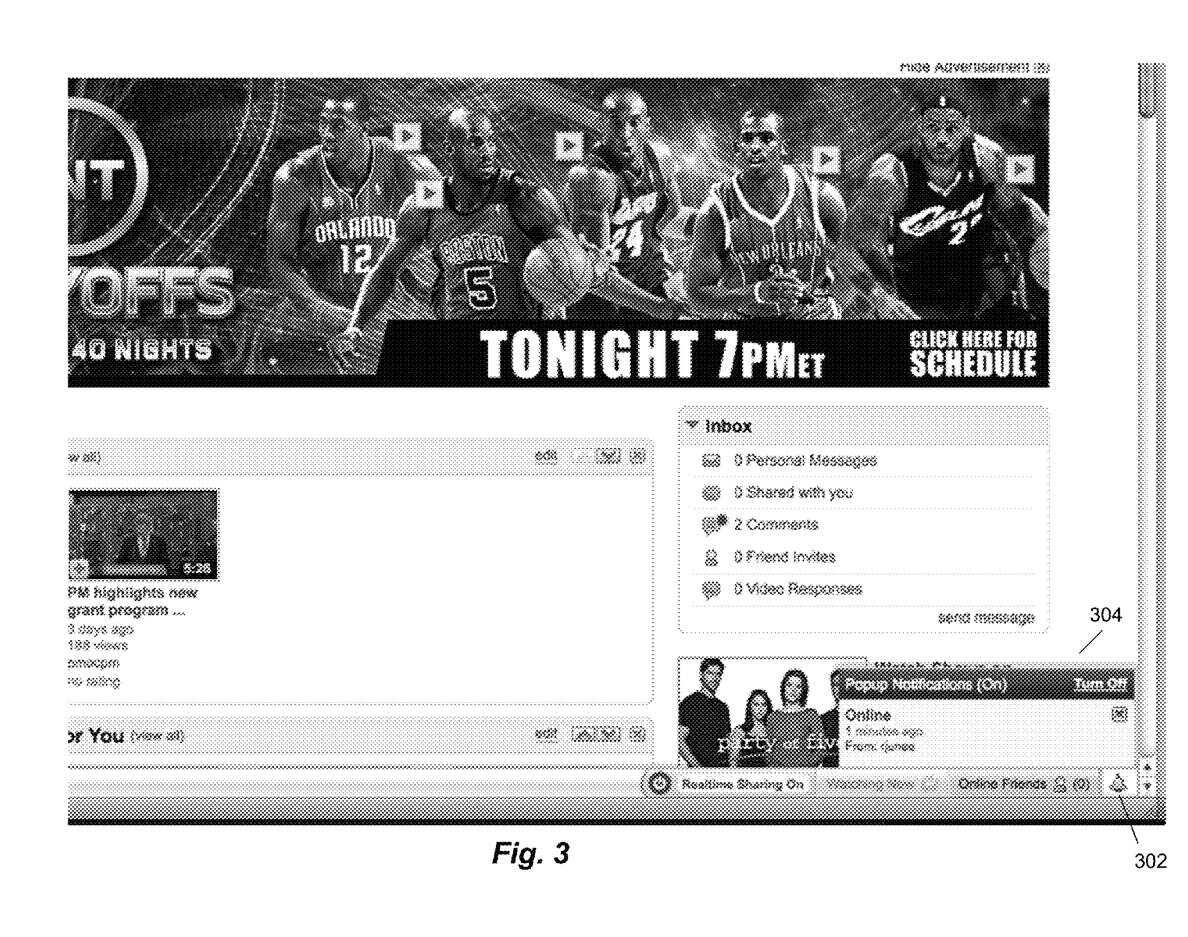
FIG. 3 illustrates an example of a user interface page including an alert in accordance with an embodiment of the present invention.

FIG. 3 illustrates an example of a UI page in which an alert has been generated for the user. The alert icon 302 is highlighted, and an alert dialog box 304 has popped up to indicate that one of the user's friends is now online. In one embodiment, the popup notification includes an option to disable future popup notifications. Note that as alluded to above, the example of FIG. 3 is not a video watch page, but a different page associated with video hosting site 102—in this case, a user's main page that includes advertising, inbox statistics, and the like.

Figure 4A:
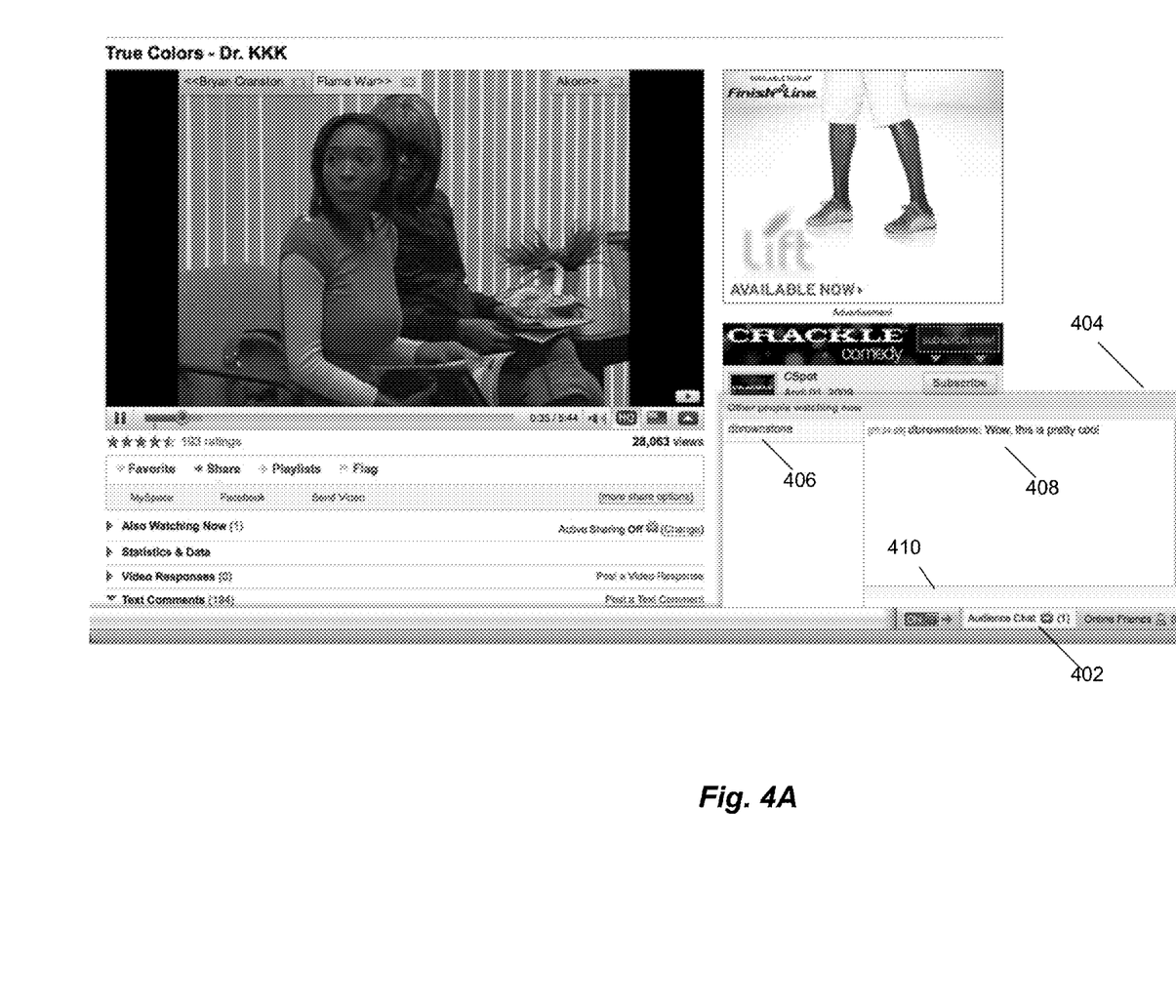
FIG. 4A illustrates an example embodiment of the present invention in which users can chat while watching a video.

In one embodiment, such as the one illustrated in FIG. 4A, friends watching the same video on the same website, or group of websites controlled by the same entity, can chat with one another. An audience chat UI element 402 can be selected, and a pop-up window 404 appears, listing the names of the current viewers 406, and their comments 408. A space 410 is also provided for entering chat text. In one embodiment, all users viewing the watch page can participate in the chat. In an alternative embodiment, only those users who are common friends (i.e. everyone in the chat is friends with everyone else in the chat) can participate. Other participation rules may be set by the implementer in various embodiments, e.g., a friend of one participant can participate in the chat, even if she is not friends with any of the other participants.

Figure 4B:
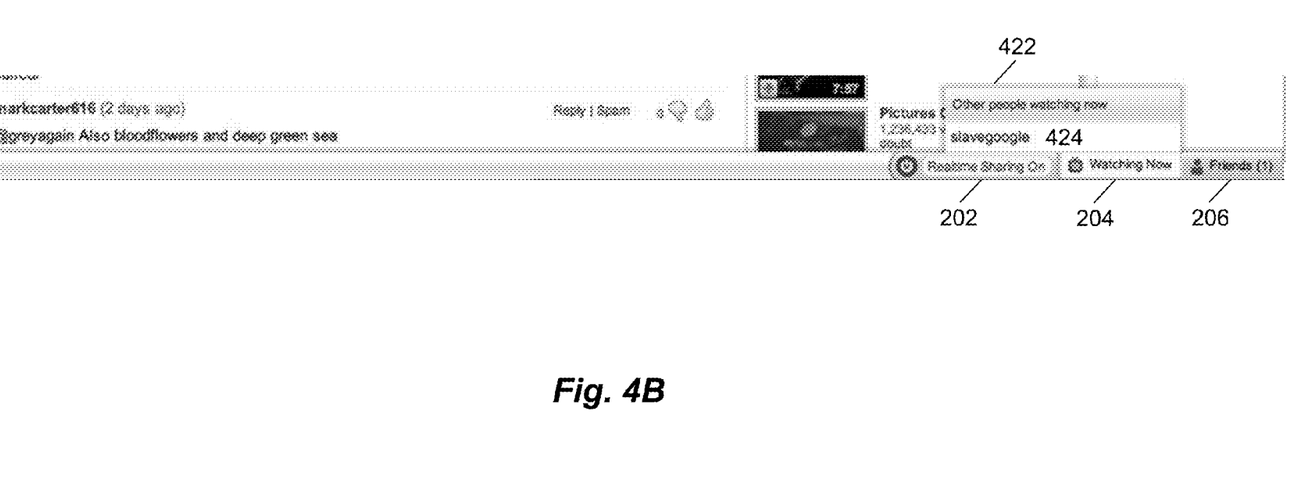
FIG. 4B illustrates an example of user interface elements informing a first user of other users watching the same video as the first user in accordance with an embodiment of the present invention.

FIG. 4B illustrates another example of user interface element on watch page 200 informing a first user of other users watching the same video as the first user. In this example, button 206 informs the first user that one of the first user's friends is online. The first user may select the button 206 to view information about the online friend. Moreover, FIG. 4B illustrates that button 202 and button 204 have been selected indicating that the realtime sharing feature is enabled and the user wants to see the list of other users watching the same video as the user. In one embodiment, responsive to the selection of button 204, a pop up window 422 displays the identification 424 of another user "slavegoogle" who is watching the same video as the first user. The user "slavegoogle" need not be a friend of the first user to be displayed on the list of other users watching the same video. In one embodiment, the displayed list of users watching the same video only includes the friends of the first user.

Figure 5:
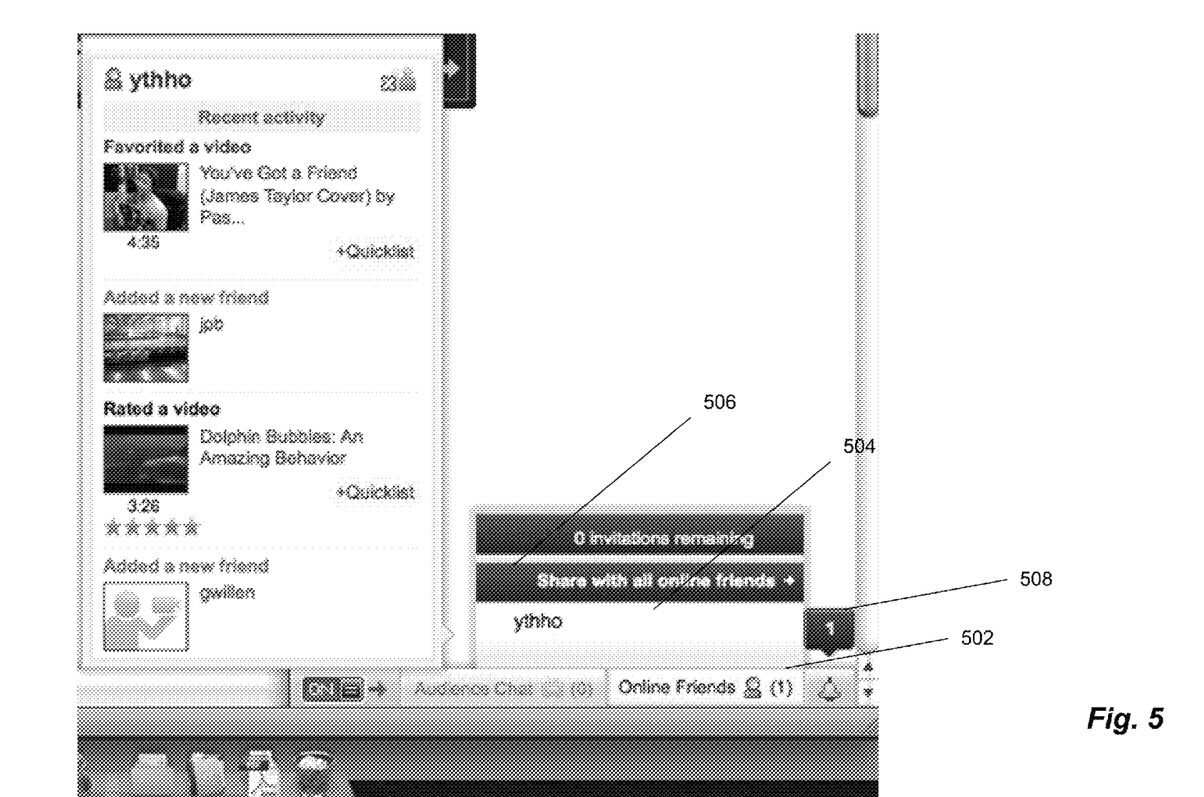
FIG. 5 illustrates a first example of user interface elements for tracking friend activities in accordance with an embodiment of the present invention.
Figure 7:
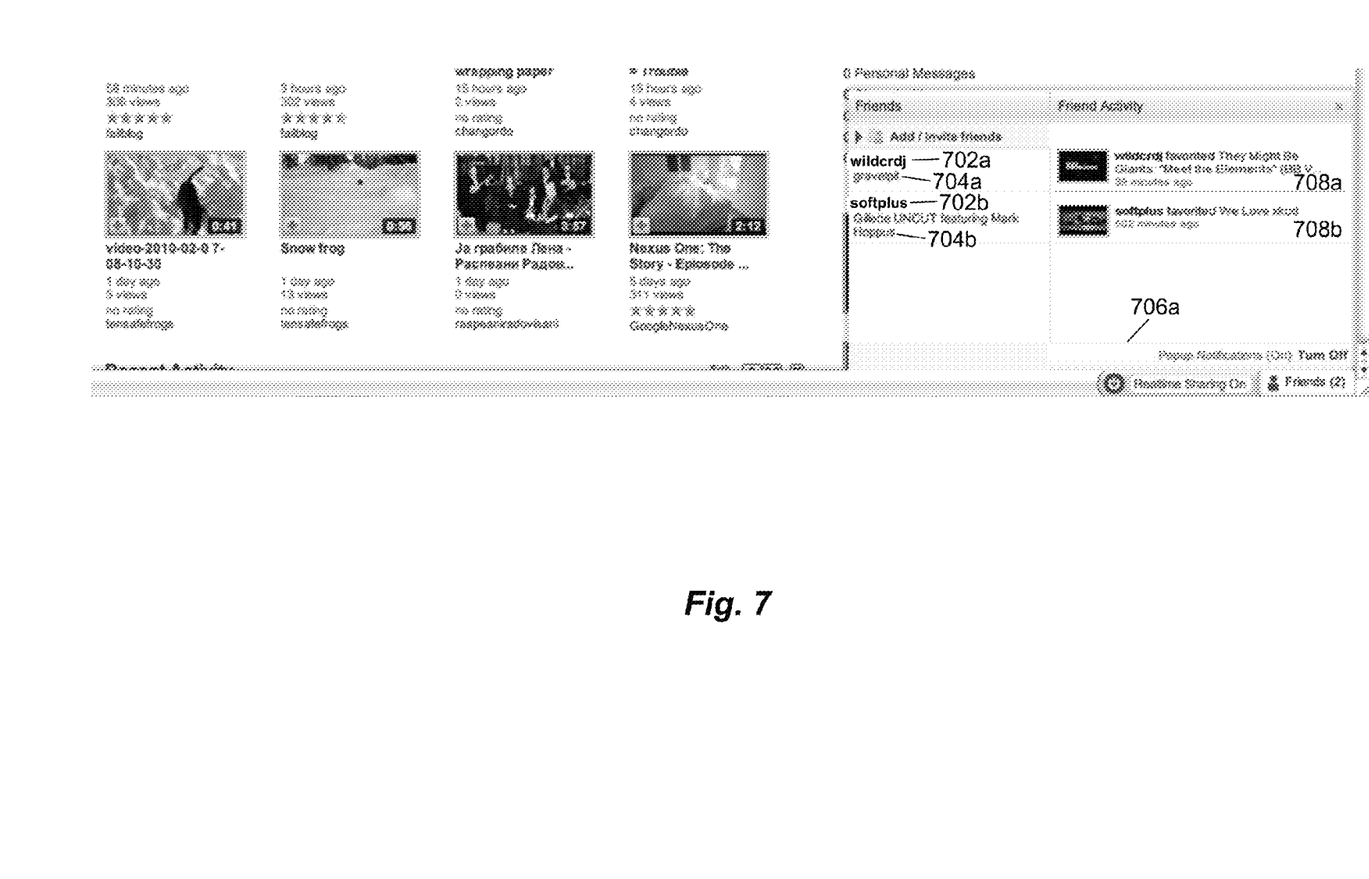
FIG. 7 illustrates a second example of user interface elements for tracking friend activities in accordance with an embodiment of the present invention.

FIG. 5 illustrates UI elements for tracking friend activities in accordance with an embodiment of the present invention. In the illustrated case, UI element 508 indicates that the user has one alert. Responsive to selection of the element 508, a popup window (not shown) displays information about the alert to the user. Additionally, UI element 502 indicates that one friend is online. By selecting the element (e.g., clicking on a button), a popup window 504 expands to show the user ID of the online friend. Although only one online friend is present in the example of FIG. 5, multiple friends may be listed if they are in fact online. In one embodiment, by selecting one of the listed friends, that friend is sent an invitation to join the user in watching the video currently being watched by the user. In one embodiment, a user interface element 506 allows a user to simultaneously invite all of her online friends to come and watch the same video. In one embodiment, a listing for a friend can be expanded, for example by placing a mouse pointer over the friend's name. FIG. 7 illustrates an example of UI elements displaying information about the user's friends.

FIG. 7 illustrates a popup notification 706a that includes the identification 702a-b for the two online friends. In one embodiment, additional information about the friend can also be displayed with friends' identification in the popup notification 706a. For example, in one embodiment, the friends' identification 702a-b is accompanied by the name or identification 704a-b of the content the friends are currently accessing. In one embodiment, the friends' identification 702a-b is also accompanied by the friends' latest online activity 708a-b. For example, FIG. 7 illustrates that the user's online friend "wildcrdj" 702a favorited content named "They Might Be Giants: Meet the Elements" and the user's online friend "softplus" 702b favorited content named "We Love xkcd."

Figure 8:
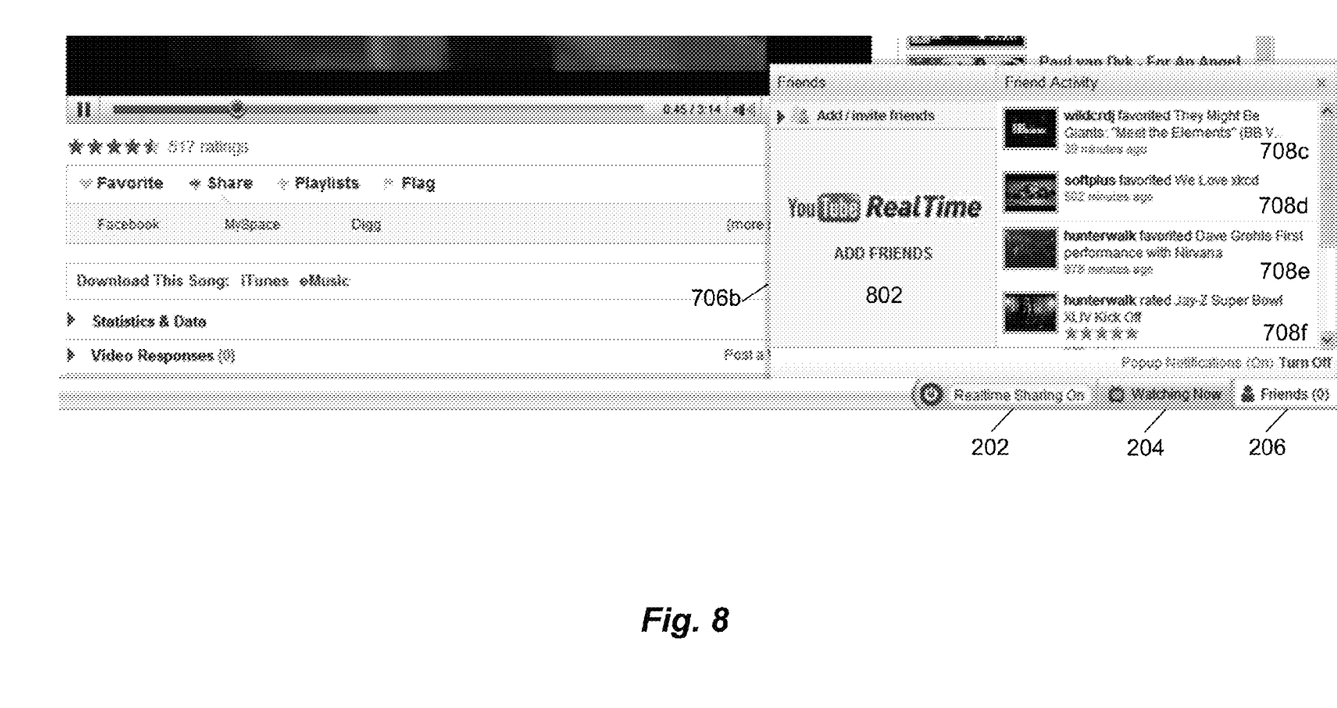
FIG. 8 illustrates a third example of user interface elements for tracking friend activities in accordance with an embodiment of the present invention.

FIG. 8 illustrates another example of popup notification 706b. In this example, none of the user's friends are online and therefore the popup notification 706b does not display any of the user's friends as online. Moreover, this embodiment of the popup notification 706b includes an option 802 to add friends. The user can select this option to add online friends. Like the example of FIG. 7, the popup notification 706*b* in FIG. 8 also displays the user's friends' latest online activity 708*c-f* even though the friends are not online.

Figure 9:
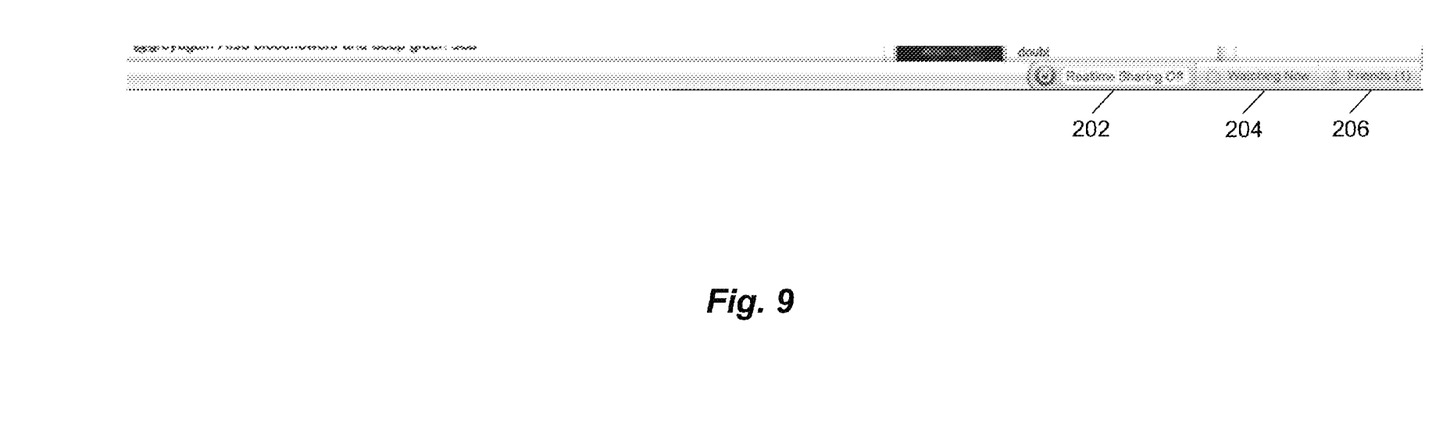
FIG. 9 illustrates an example of user interface elements for enabling users to stop sharing the status of their online activities with other users and receiving the status of other users' online activities according to one embodiment of the present invention.

As described above, FIGS. 2-5 and 7-9 illustrate examples of the user interface elements available to the user for sharing her online activities with other users. The user may also choose not to share her online activities. Referring to FIG. 9, a user can choose to turn off the realtime sharing with her friends by selecting button 202. After the user selects button 202 the realtime sharing features switches from its "on" state to "off" state. Accordingly, the user's friends or other website users cannot see the user's online activity anymore. In one embodiment, the user cannot see the online activities of other users either when the realtime sharing feature is turned off. In another embodiment, the user enters an invisible mode by selecting an invisible button (not shown) while the realtime sharing feature is turned on. In this embodiment, the user's online activities are not visible to other users but the user can see the online activities of other users.

Figure 6:
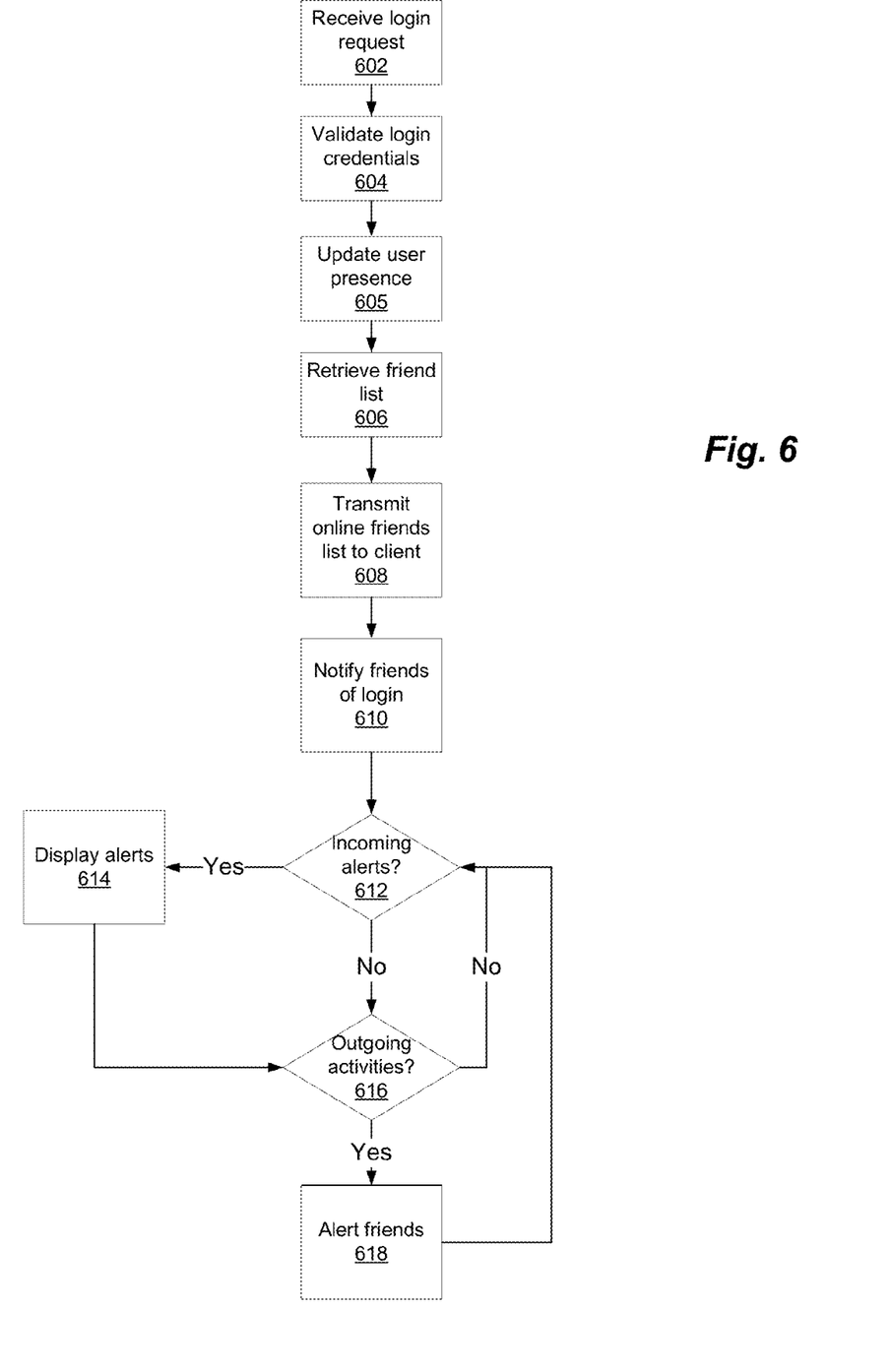
FIG. 6 is a flowchart illustrating a method for providing collaborative viewing to users by a video hosting site in accordance with an embodiment of the present invention.

FIG. 6 is a flowchart illustrating a method for providing collaborative viewing to users by a video hosting site in accordance with an embodiment of the present invention. Initially, video hosting website 102 receives 602, e.g., via web server 204, a login request from a client 120. Authentication module 112 validates 604 the user's credentials, and logs the user in to the video hosting site. Interaction engine 110 then updates the user's presence status as online and available. In one embodiment, users are by default set to a status of available when they log in to hosting site 102. In alternative embodiments, users may set a default preference of available, busy, invisible, or the like. Interaction engine 110 then determines 606 a list of the user's friends, for example by referring to user database 116, and transmits 608 a list of online friends and their presence information to client 120. In one embodiment, information about online friends is transmitted as a packet listening all online friends. In an alternative embodiment, an online friend notification is received individual from a particular process representing each online friend. Similarly, for each online friend, interaction engine 110 notifies 610 that friend that the user has logged on to the site 102, for example by providing a pop-up notification, or adjusting a user interface element such as UI element 206 (FIG. 2). In one embodiment, interaction engine 110 attempts to contact a process for each of the user's friends. If that friend is online, a process exists and is informed of the user's presence. Next, interaction engine 110 determines 612 whether there are any incoming alerts for the user. If so, then the alerts are displayed 614 to the client 120, e.g., as a notification 508 (FIG. 5).

As the user navigates the video hosting site 102 and undertakes various activities, such as watching a video, commenting on a video, adding a friend, rating a video, adding a video to a playlist, inviting an online friend to a video watch page etc., interaction engine 110 detects 616 these activities and generates 618 alerts that are sent to the user's online friends. In one embodiment, alerts are sent using inter-process communication, such as, for example, from one user process to another, or via a video process intermediary, etc. Interaction engine also continues to receive incoming alerts from the user's friends as they are generated by the friends' activities.

As noted, in one embodiment each user is represented internally as a server process, and inter-process communication allows messages to be passed from one process to another about users' availability and actions. Similarly, each video is represented by a process in one embodiment, and each video process tracks each user currently watching that video. In alternative embodiments, other implementations can be used to track user activities and online presence, such as storing user actions in user database 116.

In one embodiment, a stateful connection between a client 120 and video hosting website 102 is maintained using an RTMP (real-time messaging protocol) connection. Alternatively, an HTTP or other type of connection can be used.

Collaborative viewing of videos as described here additionally serves a function of an informal video recommendation mechanism. Interaction engine 110 enables a user to summon her friends to a video she is currently watching, thus implying a recommendation of that video. In addition, by viewing the recent history of an online friend, users can see which videos their friends have watched very recently, providing an additional set of implied recommendations.

As noted, in some embodiments any user of the video hosting site 102 can be followed by a user, not just a predefined list of friends. In either case, ad-hoc groups of users who happen to be online simultaneously can form and explore the contents of video hosting site 102 together. Because each user in the group can see what others in the group are doing in real time, each can follow others from video to video and experience the site together.

The present invention has been described in particular detail with respect to a limited number of embodiments. Those of skill in the art will appreciate that the invention may additionally be practiced in other embodiments.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component. For example, the particular functions of interaction engine 110, video serving module 106, and so forth may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for viewing digital video content on a video hosting site, the method comprising:
    sending, by a server, digital video content over a network to a first client device for display on the first client device;
    receiving, by the server, a request from the first client device to determine other viewers watching the digital video content;
    responsive to receiving the request, determining, by the server, a second client device to which the digital video content is also being sent, whereby the digital video content is displayed on the second client device asynchronously from display of the digital video content on the first client device of the first viewer; and
    providing, by the server, over the network to the first client device an indication that the second client device is displaying the digital content.

2. The method of claim 1, further comprising: providing, by the server, over the network to the second client device, an indication that the first client device is displaying the digital content.

3. The method of claim 1, wherein each client device is represented within the server with an executing process, and wherein automatically determining the second client device comprises the server contacting the executing process representing the second client device.

4. The method of claim 1, wherein the digital video content is represented by a process and the process tracks client devices currently watching the digital video content, wherein automatically determining a second client device comprises identifying a client device tracked by the process.

5. A computer program product for providing real-time collaborative viewing of digital video content on a video hosting site, the computer program product stored on a non-transitory computer-readable medium and including computer code adapted when loaded into memory to cause a processor to carry out the steps of:
    sending digital video content over a network to a first client device for display on the first client device;
    receiving a request from the first client device to determine other viewers watching the digital video content;
    responsive to receiving the request, automatically determining a second client device to which the digital video content is also being sent, whereby the digital video content is displayed on the second client device asynchronously from display of the digital video content on the first client device of the first viewer; and
    providing over the network to the first client device an indication that the second client device is displaying the digital content.

6. The computer program product of claim 5, where in the computer code is further adapted to cause the processor to carry out the step of: providing, over the network to the second client device, an indication that the first client device is displaying the digital content.

7. The computer program product of claim 5, wherein each client device is represented by an executing process, and wherein automatically determining the second client device comprises contacting the executing process representing the second client device.

8. The computer program product of claim 5, wherein the digital video content is represented by a process and the process tracks client devices currently watching the digital video content, wherein automatically determining a second client device comprises identifying a client device tracked by the process.

9. A computer program product for collaborative viewing of digital video content on a video hosting site, the computer program product comprising a non-transitory computer-readable medium including instructions adapted for execution on a processor on a client device, the instructions causing the processor to carry out the steps of:
    transmitting a request from a requestor to the video hosting site to view a video, the video provided to the client device from the video hosting site over a network, wherein the requestor is logged in to the video hosting site from the client device;
    receiving, from the requestor, a selection of at least one user from a list of users contemporaneously logged in, with the requestor, to the video hosting site;
    transmitting an invite to the selected user to view the video;
    transmitting a request to determine other viewers viewing the video; and
    responsive to transmitting the request, receiving an indication that the selected viewer is viewing the video, the video displayable to the selected viewer asynchronously from the video displayed to the requestor.

10. The computer program product of claim 9 wherein the video is embedded in a web page displayed on a computer of the requester.

11. The computer program product of claim 10 wherein the displayed web page includes a list of users contemporaneously viewing the video.

12. The computer program product of claim 11 wherein each of the users in the list of users is associated with a set of friends identified to the video hosting site by the requester.

13. The computer program product of claim 11 wherein the displayed web page includes a chat interface enabling each of the list of users contemporaneously viewing the video to chat with the other users as a group.

14. The computer program product of claim 10 wherein a user interface element of the web page displays an alert, the alert indicating that a user has logged in to the video hosting site.

15. The computer program product of claim 14 wherein the alert identifies a user that is associated with a set of friends identified to the video hosting site by the requester.

16. A system for collaborative viewing of digital video content on a video hosting site, comprising:
   a processor configured to execute instructions;
   a non-transitory computer-readable memory storing instructions executable by the processor and causing the processor to carry out the steps of:
      transmitting a request from a requestor to the video hosting site to view a video, the video provided to the client device from the video hosting site over a network, wherein the requestor is logged in to the video hosting site from the client device;
      receiving, from the requestor, a selection of at least one user from a list of users contemporaneously logged in, with the requestor, to the video hosting site;
      transmitting an invite to the selected user to view the video;
      transmitting a request to determine other viewers viewing the video; and
      responsive to transmitting the request, receiving an indication that the selected viewer is viewing the video, the video displayable to the selected viewer asynchronously from the video displayed to the requester.

17. The system of claim 16 wherein the video is embedded in a web page displayed on a computer of the requester.

18. The system of claim 17 wherein the displayed web page includes a list of users contemporaneously viewing the video.

19. The system of claim 18 wherein each of the users in the list of users is associated with a set of friends identified to the video hosting site by the requester.

20. The system of claim 18 wherein the displayed web page includes a chat interface enabling each of the list of users contemporaneously viewing the video to chat with the other users as a group.

21. The system of claim 17 wherein a user interface element of the web page displays an alert, the alert indicating that a user has logged in to the video hosting site.

22. The system of claim 21 wherein the alert identifies a user that is associated with a set of friends identified to the video hosting site by the requester.

\* \* \* \* \*

UNITED STATES PATENT AND TRADEMARK OFFICE
CERTIFICATE OF CORRECTION

PATENT NO. : 9,253,225 B1  
APPLICATION NO. : 14/029583  
DATED : February 2, 2016  
INVENTOR(S) : Ryan Junee et al.

Page 1 of 1

It is certified that error appears in the above-identified patent and that said Letters Patent is hereby corrected as shown below:

ON THE TITLE PAGE

Item (60), replace "61/171,764" with --61/171,746--.

Signed and Sealed this  
Third Day of May, 2016

Michelle K. Lee  
*Director of the United States Patent and Trademark Office*